United States Patent [19]

Behar

[11] 4,371,285
[45] Feb. 1, 1983

[54] CONNECTION BETWEEN TWO BODIES

[76] Inventor: Abraham Behar, P.O. Box 848, Catano, P.R. 00632

[21] Appl. No.: 125,900

[22] Filed: Feb. 29, 1980

[51] Int. Cl.³ ............................................. F16B 17/00
[52] U.S. Cl. .................................. 403/339; 403/353; 405/251
[58] Field of Search ................ 405/251, 252; 403/339, 403/340, 364, 353

[56]  References Cited
U.S. PATENT DOCUMENTS

| 594,043 | 11/1897 | Thompson et al. | 403/339 |
| 893,163 | 7/1908 | Hafemeister | 403/340 |
| 1,272,131 | 7/1918 | Silberg | 403/340 |
| 1,853,578 | 4/1932 | Ross | 403/364 X |
| 3,104,532 | 9/1963 | Severinsson | 405/252 |
| 3,356,398 | 12/1967 | Nilsson et al. | 405/252 X |
| 4,171,919 | 10/1979 | Willis | 403/364 X |

Primary Examiner—Andrew V. Kundrat
Attorney, Agent, or Firm—Scrivener, Clarke, Scrivener and Johnson

[57]  ABSTRACT

The disclosure is of means for connecting two bodies in abutting surface-to-surface relation by means of interfitting hooks and recesses, upon relative movement of the surfaces with respect to each other.

1 Claim, 10 Drawing Figures

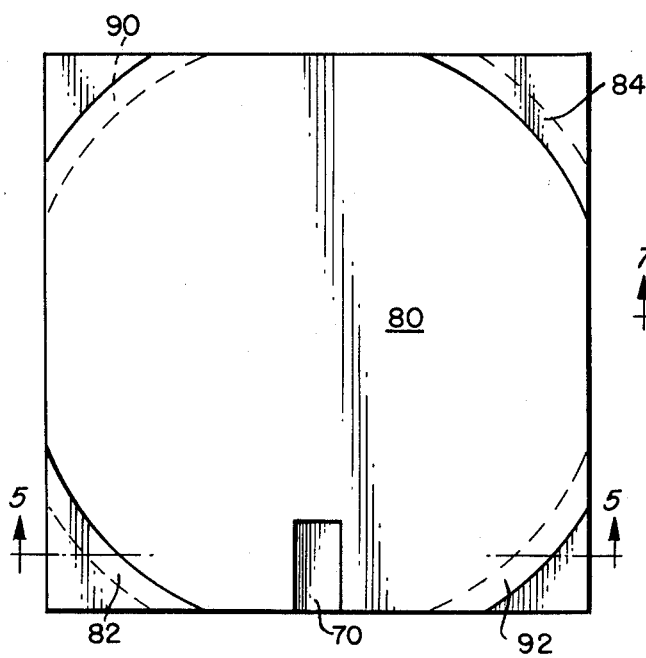
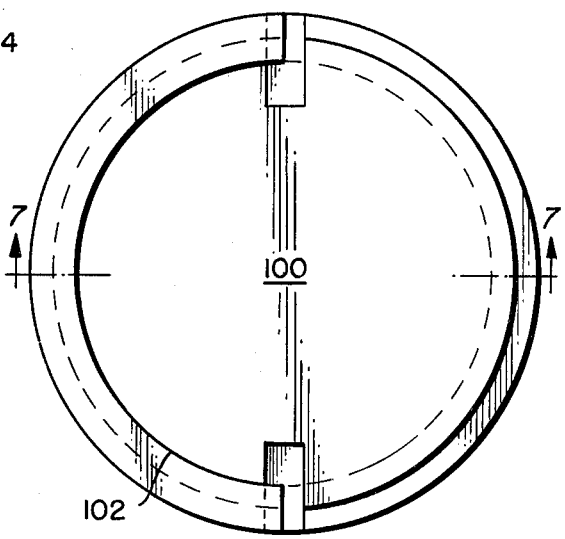
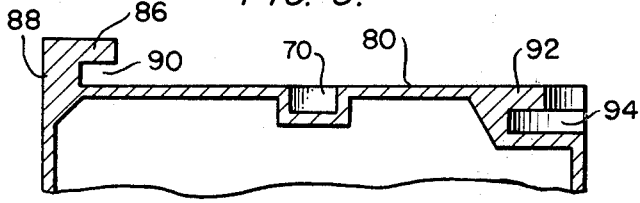
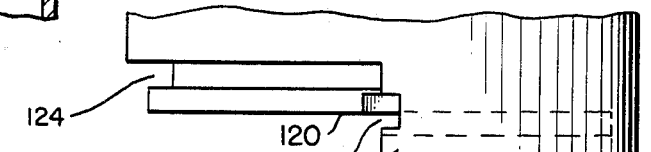
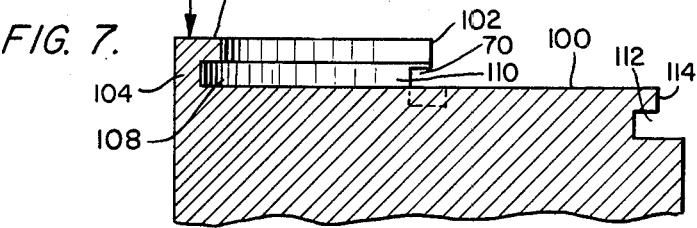
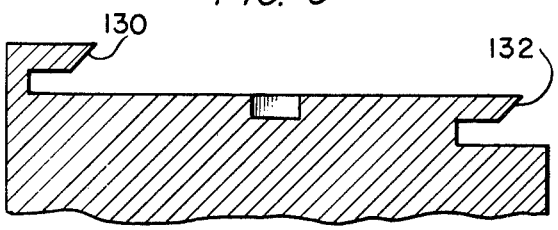
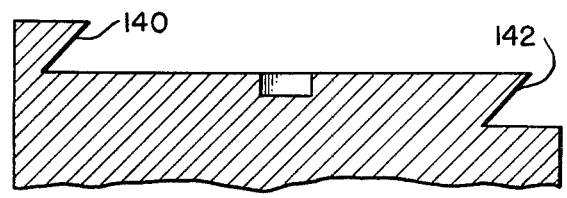

CONNECTION BETWEEN TWO BODIES

SUMMARY OF THE INVENTION

The means for connecting two bodies comprises at least one hook on one body and at least one recess in another body, each hook being above a surface of its body and each recess being below a surface of its body, the hooks and recesses being constructed and adapted to closely interfit when the two bodies are brought together with the surfaces in sliding engagement with each other, additional means being provided for preventing relative movement of the two bodies after engagement of the hooks and recesses.

DESCRIPTION OF THE DRAWINGS

FIG. 4 is a plan view of a body showing a modified form of the connecting means provided by the invention;

FIG. 5 is a sectional view taken on line 5—5 of FIG. 4;

FIG. 6 is a plan view of a body showing a further modified form of the invention;

FIG. 7 is a sectional view taken on line 7—7 of FIG. 6;

FIG. 8 is a partial side elevational view of a second body similar to that of FIG. 6;

FIGS. 9 and 10 are partial sectional views of any of the bodies to which the invention may be applied, showing modifications of the form of the connecting means.

DESCRIPTION OF THE INVENTION

The two bodies to be connected by the means provided by the invention may be of any type or configuration such as rectangular, parallelopiped, cylindrical, tubular or other, and may be the same or different in type and construction, it being required only that the two bodies have complementary surfaces which may be moved over and with respect to each other in a sliding rectilinear, arcuate or other motion with the surfaces in engagement with each other. The preferred embodiments of the invention are described in this specification, and it will be understood that the invention is not limited to the provision of these embodiments on bodies of the described types or configurations.

Figure 1:
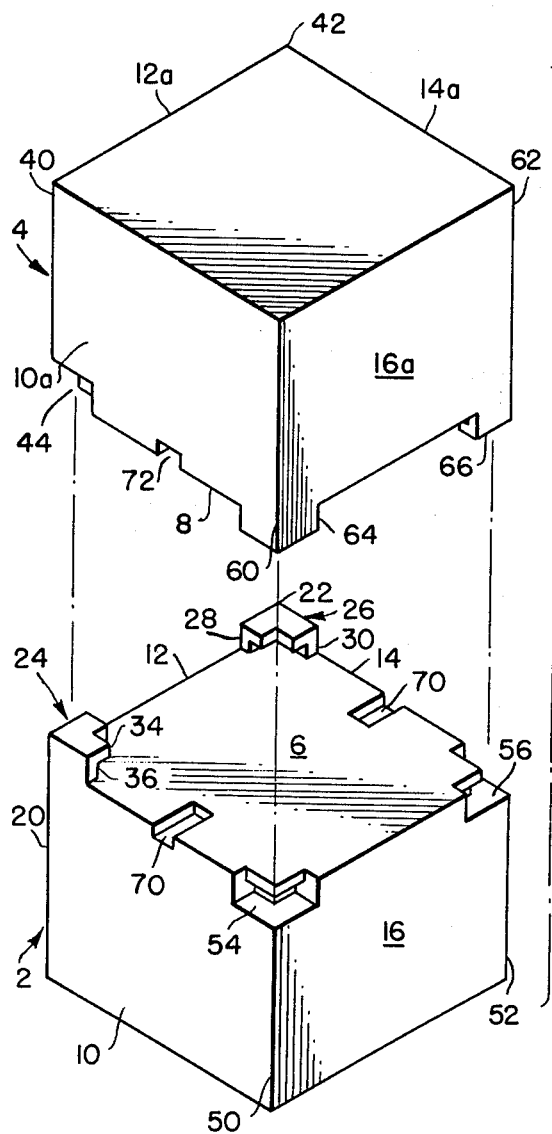
FIG. 1 is a perspective view of two un-connected rectangular parallelopiped bodies, showing the means provided by the invention for connecting them.
Figure 2:
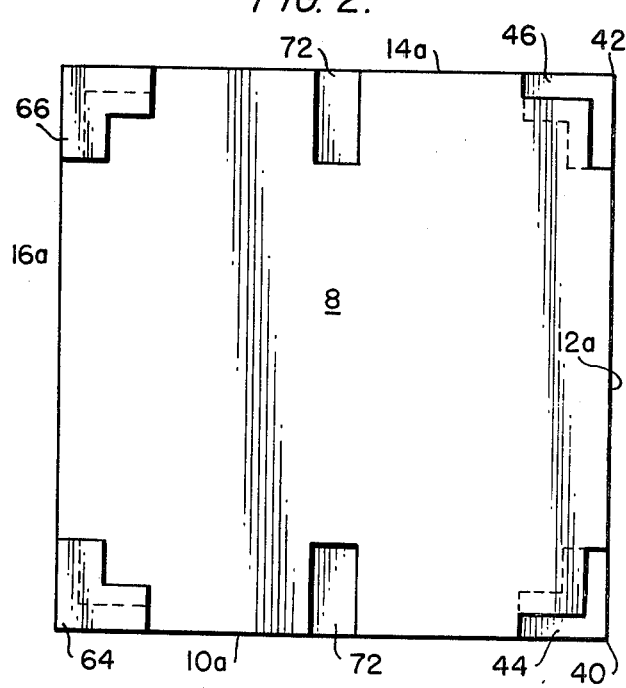
FIG. 2 is a plan view of that surface of the upper one of the bodies of FIG. 1 on and within which the hooks and recesses are formed.
Figure 3:
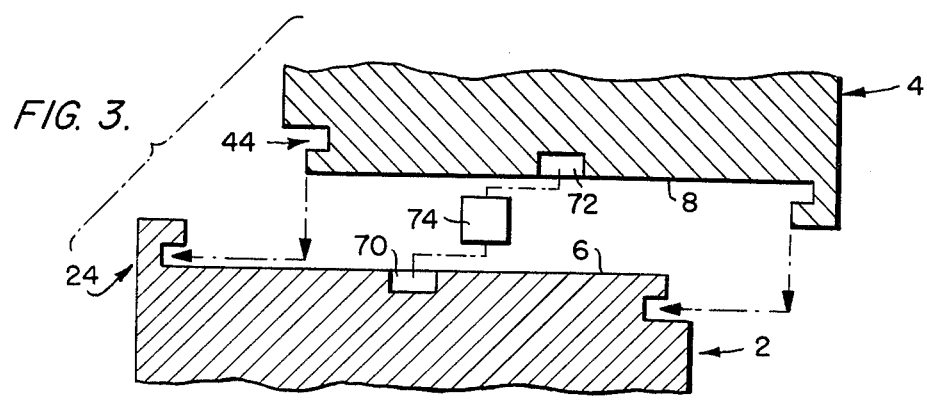
FIG. 3 is a partial sectional view through parts of the two blocks of FIG. 1, showing the connecting means.

In FIGS. 1 to 3 there are disclosed means according to the invention for connecting two bodies 2, 4 of rectangular parallelopiped shape, having adjacent flat surfaces 6, 8 and side walls 10, 12, 14, 16 and 10a, 12a, 14a, 16a. At two of the adjacent corners 20, 22 of body 2 there are provided hooks 24, 26 which may be identical in construction and configuration. Each hook comprises an inner part having two arms 28, 30 which may be of equal length and which are normal to each other and are preferably integral with body 2 and have outer surfaces which extend outwardly from surface 6 in prolongation of the adjacent side walls 10, 12 and 12, 14 of the body 2. A lip 34 which is also of right angular shape in the described embodiment extends outwardly from the arms 28, 30 in spaced relation to the surface 6 thereby providing a recess 36 beneath lip 34 and between the lip and surface 6 and internally of the arms 28, 30. This recess is right angular in shape because it underlies the right-angular shape lip 34 and is bounded by the inner surfaces of the arms 28, 30.

At two adjacent corners 40, 42 of the body 4 at and below surface 8, there are provided two recesses 44, 46 which are preferably identical in configuration and each of which is formed and shaped to snugly receive the parts of one of the hooks 24, 26, of body 2. Each recess is therefore formed by removing the two sides forming the corner at and below the level of surface 8 to a width, lengths and depth equal to those of either of the two arms 28, 30 of the hooks, forming a recess of right angular shape, and from this recess undercutting below surface 8 to form a recess having the right angular size and shape of the lip 34. It will be seen that each of the recesses 44, 46 will snugly receive the parts 28, 30, 34 which form one of the hooks 24, 26.

At the second pair of adjacent corners 50, 52 of body 2 there are formed recesses 54, 56 which, in the embodiment being described, are identical in size and configuration to the recesses 44, 46 in body 4. Also, at the second pair of adjacent corners 60, 62 of body 4 there are provided hooks 64, 66 which are of such size and configuration that each will be snugly received within one of the recesses 54, 56 of the body 2.

In the use of the connecting means provided by the invention the surfaces 6, 8 of the two bodies are brought together in substantial parallelism and surface-to-surface engagement, and the hooks 24, 26 of body 2 are inserted into recesses 44, 46 of body 4, and simultaneously the hooks 64, 66 of body 4 are inserted into recesses 54, 56 of body 2, the operation being performed by sliding one surface over the other until the hooks and recesses are fully engaged. It will be apparent that this engagement of the hooks and recesses will prevent separation of the two bodies in directions normal or substantially normal to the surfaces 6, 8.

Means are provided by the invention for locking the two bodies together after mutual engagement of the hooks and recesses. Such means comprises grooves 70, 72 which are formed, respectively, in the bodies 2, 4 and which extend across the cooperating surfaces 6, 8 of the two bodies from registering side surfaces 10, 10a and are therefore in such positions that when the hooks and recesses of the two bodies are fully engaged the two grooves are in registry, thus forming a composite keyway into which a plug 74 may be driven which prevents any relative transverse movement of the two bodies.

While in the previously described embodiment the bodies are connected upon relative linear movement, the invention also provides means for effecting the connection by other types of relative movement of the two bodies. In FIGS. 4 and 5 there is disclosed means for effecting connection by relative rotational movement of two bodies which may be of any external configuration such as rectangular parallelopiped, cylindrical or other, having end surface 80. In this embodiment each body is provided with two diametrically opposite arcuate shaped hooks 82, 84 each comprising an arcuate lip 86 which is connected to surface 80 by an upstanding arcuate ridge 88 which is preferably integral with both the lip and the body and which borders an arcuate recess 90. The inner arcuate edges of the two lips are concentric and the inner and outer arcuate surfaces of the tow ridges 88 are, respectively, also concentric. The body is also provided with two diametrically opposite arcuate shaped recesses 90, 92 which are equidistantly positioned between the hooks 82, 84. Each recess comprises an outer part 92 having an external arcuate edge which is positioned inwardly of the peripheral edge of the body by a distance equal to the width of the lip 86 of each hook part. Inwardly of the outer part 92 the body is recessed to provide a recess 94 the shape and size of which are such that it will snugly receive the arcuate lip of either of the hook parts 82, 84. The second of the two bodies to be connected is provided with hooks and recess duplicating exactly those described in connection with body 80, and it will be apparent that connection of the two bodies will be effected by positioning the hooks and recesses of each body between those of the other body with the surfaces of the two bodies in engagement and then rotating the bodies with respect to each other to cause the hooks of each body to enter the recesses of the other body. The body shown in FIGS. 4 and 5 is provided with locking recess 70 and the body to be connected to it is provided with co-operating recess 72, and these recesses receive the locking plug 74 when they are in registry, as described above.

A still further embodiment of the invention is disclosed in FIGS. 6, 7 and 8, in which connecting means according to the invention are provided for the connection of two cylindrical or tubular bodies. On one end surface 100 of one of these bodies, which is shown in FIGS. 6 and 7, there is provided a semicircular hook 102 comprising a semi-circular part 104 which extends upwardly from surface 100 and to which there is connected preferably integrally a semi-circular shaped flange 106 which extends inwardly of the body from part 104 and thereby forms a lip 108 overhanging a semi-circular recess 110. The remainder of the periphery of the surface is cut away as shown at 112 to form a recess of semi-circular extent which is below the surface 100 and is defined by the lower surface of an overhanging semi-circular lip 114, and the semi-circular hook and the semi-circular recess combine to form the entire periphery of the body above and below the surface 100.

The second body, to which the body shown in FIGS. 6 and 7 is to be connected, is shown in FIG. 8 superposed over the first body of FIG. 7 and ready for attachment thereto by the means provided by the invention. This second body has an end surface 120 and adjacent and over this surface there is formed a semi-circular hook 122 the parts of which are of such size and configuration that they will be snugly received within the recess 110 in the first body. The remainder of the periphery of the second body, at and below surface 120, is formed as a recess 124 of semi-circular extent the parts of which are of such size and configuration that the recess snugly receives the hook 102 of the first body.

It will be seen that by bringing the surfaces together with the hook of one body received with the recess of the other body the two bodies may be joined together by relative sliding of the bodies with the end surfaces in sliding surface-to-surface engagement. As in other forms of the invention the two bodies are provided with locking recesses 70, 72 for the reception of a locking plug 74, as described above.

It will be understood that the recess on any one of the bodies is not necessarily of such size and configuration to receive the hook of the same body, the only requirement being that the hook or hooks of one body are of such respective size and configuration that each will be received snugly within a recess of the other body.

If desired, and in further accordance with the invention, means are provided for facilitating the insertion of the hooks into the recesses, and such means are shown in FIG. 9, in which the lower surface of the lip of each hook is tapered from its internal, or leading, edge toward the adjacent corner of the body of which the hook forms a part, as shown at 130, and the corresponding edge of each recess is correspondingly shaped as shown at 132.

In another modification of the invention, which is illustrated in FIG. 10, the configurations of the hooks and recesses are modified to produce a self-tightening effect as the hooks are introduced into the recesses. In this embodiment the lower surface 140 of the lip of each hook is inclined from its internal edge toward the outer wall of the body and the surface 142 of each recess is correspondingly inclined.

I claim:

1. As a new article of manufacture, a body having a side wall and an end surface and means at and adjacent the end surface for connecting the body to a second body having the same connecting means, the connecting means comprising:
  a. at least one inwardly facing hook adjacent the side wall and extending outwardly from the end surface comprising a first part having an outer surface forming an extension of the adjacent side wall and a second part overhanging the end surface and spaced therefrom and providing a recess above the end surface between the two parts, and
  b. at least one outwardly facing recess formed in the side wall beneath the end surface at a location spaced from the hook and, defined by a lower surface beneath the end surface and parallel thereto, an inner wall peripendicular to the end wall, and a part overhanging the lower surface with its lower surface spaced above the lower surface of the recess and its outer edge spaced inwardly of the side wall of the body,
  c. each hook and each recess having the same size and configuration.

* * * * *